Nov. 21, 1967  D. G. KELSTROM  3,353,389
APPARATUS FOR USE IN CORRUGATING METAL HOSE
Filed April 10, 1964  2 Sheets-Sheet 1
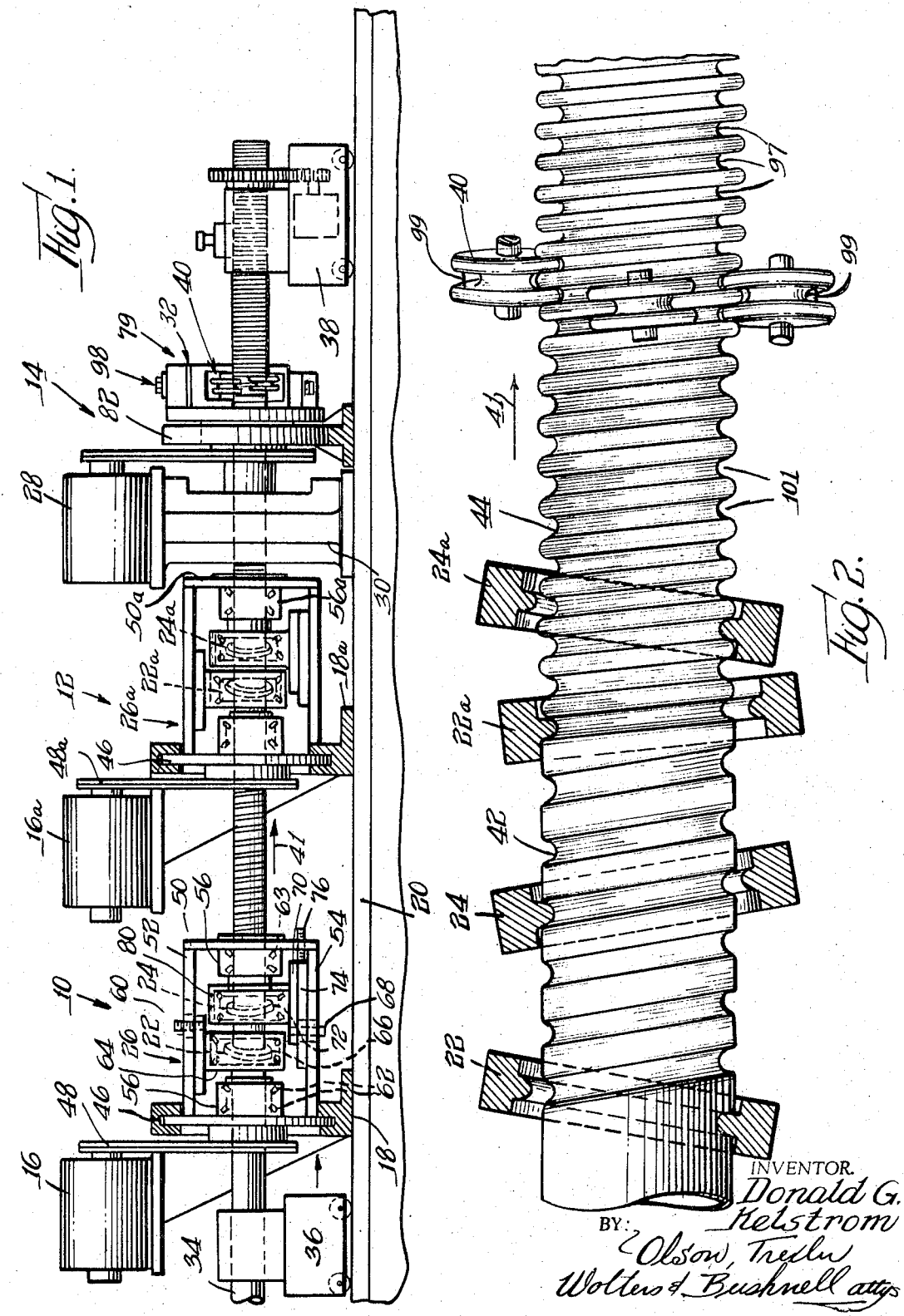
INVENTOR.
Donald G. Kelstrom
BY: Olson, Trexler,
Wolters & Bushnell attys Nov. 21, 1967 D. G. KELSTROM 3,353,389
APPARATUS FOR USE IN CORRUGATING METAL HOSE
Filed April 10, 1964 2 Sheets-Sheet 2
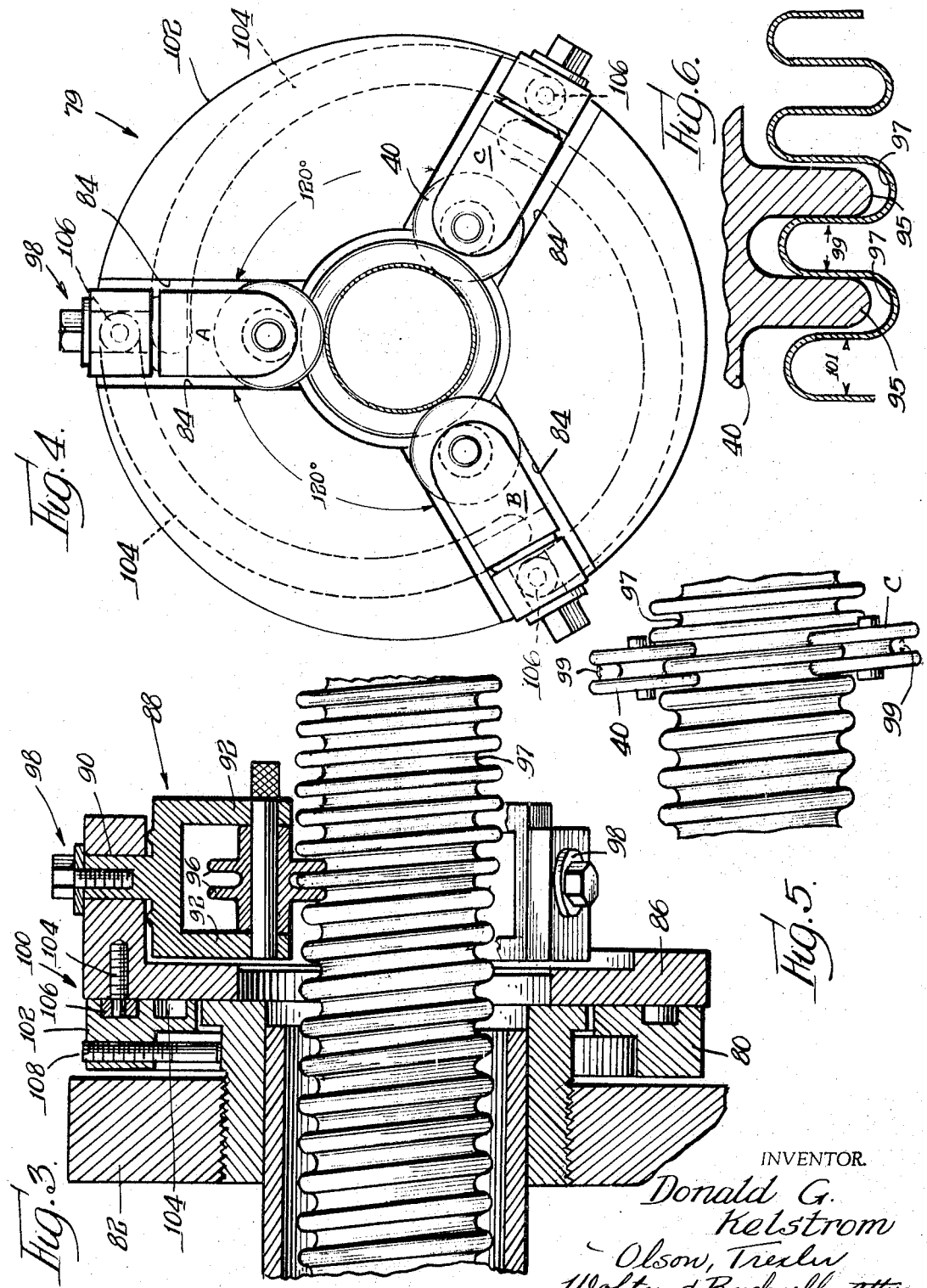
INVENTOR.
Donald G. Kelstrom
Olson, Trexler
Wolters & Bushnell attys.

3,353,389
APPARATUS FOR USE IN CORRUGATING
METAL HOSE
Donald G. Kelstrom, Elmhurst, Ill., assignor to Calumet
& Hecla, Inc., Chicago, Ill., a corporation of Michigan
Filed Apr. 10, 1964, Ser. No. 358,772
11 Claims. (Cl. 72—77)

This invention relates generally to an apparatus for use in corrugating metal hose and more particularly to an apparatus which incorporates multiple pitch forming discs in primary forming stages; and which may utilize compression rollers in a later stage, the invention being particularly useful in helically corrugating metal hose economically.

In accordance with the present invention, metal hose is helically corrugated by an apparatus utilizing one or more pairs of floating annular forming rings or discs disposed at predetermined angles, one to the other and to the longitudinal axis of the metal hose, the rings being mounted in freely rotating carriers; and utilizing compression rollers in a secondary stage rotating at the same speed as the rings and in combination with the rings, longitudinally spaced apart a predetermined distance from the rings. The helically corrugated hose produced by the method and apparatus of the present invention is formed from a stationary or rotating straight metal hose; and, as formed, it has a series of continuous undulations of a predetermined shape and depth determined by the extent of radial loading of one ring of a pair with respect to the second ring; the particular pitch multiple spacing between the rings of a pair; the inner diameter of the forming rings in comparison to the outer diameter of the hose; the thickness of the hose; and the material of which the hose is formed, among other factors.

Compression rollers in a secondary or tertiary stage are utilized after the desired corrugation shape is formed in the tubing as a highly efficient low cost means of maintaining the corrugation shape achieved by the forming rings while increasing the number of corrugations per inch.

Prior art corrugating machines have utilized forming discs and forming compression rollers of one variety or another in the corrugation of conventional metal hose. Unfortunately, conventional corrugating machines encountered almost insurmountable difficulties in attempting helical corrugation of varying sizes and types of metal hose on the same basic apparatus. Where it was desired to form a helically corrugated hose from hose of the more difficult working materials such as stainless steel or the like, friction between the forming means and the hose frequently caused galling of the hose surface; or even worse from a manufacturing viewpoint, friction caused twisting and deforming of the hose resulting in costly shut-downs and delays before resuming operations.

Attempts to use compression roller corrugating machines with hose of a different diameter or material than previously utilized often resulted in similar costly malfunctions due to inability to make the hose flow smoothly into the corrugation configuration desired due to the corrugating machine acting as a pipe cutter rather than a corrugator; and due to similar problems of galling and metal pickup.

In producing corrugated metal hose, it is frequently desired to change operations from a relatively small diameter hose, such as that utilized in carrying electric cable, to a relatively large diameter hose such as that utilized in boiler smoke stacks and the like. With conventional corrugating machines, this was often impossible, or else, while feasible it required costly shutdowns to completely dismount the forming equipment.

Where metal hose of relatively greater wall thickness is to be corrugated, similar costly delays in changeover of forming equipment have been required; and, many times, it is found that metal hose of increased wall thickness cannot be corrugated on the conventional apparatus, that is, it is not possible literally or economically to corrugate the hose because of the relatively tougher, harder to corrugate hose.

Again, frequently it is desirable after a particular configuration of corrugation has been achieved on a particular metal hose, to increase the convolutions per inch while maintaining the shape achieved; with prior art corrugating machines, this could not readily be achieved, and it was necessary to make a change in corrugation shape in order to increase the convolutions as desired.

Thus, it is an object of the present invention to provide an improved method and apparatus for helically corrugating metal hose of a wide variety of materials, hose sizes and characteristics to achieve a corrugated metal hose of a wide variety of corrugation characteristics.

It is another object of the invention to provide a corrugating method and apparatus suitable for relatively fast changeovers from one type of metal hose to another.

It is another object to provide a metal hose corrugating apparatus which may be readily adjusted to vary the size of helical corrugation.

It is another object to provide helical corrugating machine for corrugating metal hose wherein pairs of rotating spaced apart floating annular forming rings are adjustably spaced apart in predetermined multiples of the corrugation pitch desired to provide suitable means for corrugating relatively large diameter metal hose and means for achieving a very fine corrugation pitch.

A further object is to provide an apparatus suitable for helically corrugating tubing of a wide variety of materials and sizes in an economical manner.

Another object is to provide an apparatus for helically corrugating metal tubing whereby operational delays due to necessary changes of forming equipment and dimensional adjustments are minimized.

Another object is to provide an apparatus equally suitable for corrugating relatively small diameter metal hose as well as relatively large diameter hose and in corrugating metal hose having a tough surface subject to galling, and to provide such an apparatus wherein friction between the corrugation forming means and the metal hose is minimized whereby twisting, deformation, snapping and cutting of the metal hose to be formed are avoided.

It is still another object of the invention to provide an apparatus for continuously helically corrugating metal hose which apparatus is suitable for achieving a very small hose corrugation pitch; for achieving exceptionally deep corrugation grooves; and for achieving and maintaining a predetermined corrugation configuration consistent with a relatively increased number of corrugation per inch.

These and other objects and advantages of the invention will be apparent from the following description taken in conjunction with the appended claims and drawings illustrating preferred embodiments of the invention, wherein:

FIG. 1 is a schematic side view of a corrugator for metal hose arranged in accordance with the present invention;

FIG. 2 is an enlarged simplified side view of the metal hose, and the forming discs and compression rollers employed in the corrugator of FIG. 1;

FIG. 3 is a sectional elevation view of the specific arrangement of the compression rollers of FIGS. 1 and 2;

FIG. 4 is an end view of the rollers of FIG. 3 in their relation to the metal hose and showing the means for achieving adjustment of the rollers;

FIG. 5 is a plan view of the rollers and metal hose of FIG. 3;

FIG. 6 is a simplified enlarged side view of the compression rollers showing their relationship to the helical corrugations.

Referring now in detail to the drawings, specifically to FIG. 1, an apparatus for metal tubing is seen, constructed in accordance with a preferred embodiment of the invention. The corrugator includes a first stage forming station 10, a second stage forming station 12 and a third stage forming station 14. Forming stations 10 and 12 include substantially similar elements, and like elements of stations 10 and 12 have been designated by like numerals with a suffix "a" added in station 12.

Forming stations 10 and 12 comprise a motor 16, 16a mounted on a base 18, 18a suitably secured to the floor 20. A pair of forming centrally perforated discs or annular die rings comprising annular discs 22, 22a and annular discs 24, 24a are rotatably mounted at forming stations 10 and 12 within the carrier generally designated 26, 26a to be freely rotatable therein.

While forming stations 10 and 12 comprising substantially similar components, that is, a pair of rotatable forming discs at each station, are shown in the embodiment in FIG. 1, with the use of two such stations preferred, it is apparent that a single forming station comprising rotatable discs will prove adequate while in other embodiments more than two stages are useful.

A third forming station 14 comprises a motor 28 suitably mounted on a base 30 which is secured to the floor 20. A carrier 32 is shown in forming station 14 rotatably mounted to the base 30 and carrying therein a trio of circumferentially and axially spaced apart rotating compression rollers 40, freely rotating about their own axes and rotatable about the longitudinal axis of the hose.

As thus seen in FIG. 1, a continuous length of metal hose 34 to be helically corrugated, is seen at the left side of FIG. 1 freely supported for movement axially on cart 36, the metal hose entering the first stage forming station 10, continuing through second stage forming station 12 and thence into third stage forming station 14, with a completed length of helically corrugated metal hose seen at the right hand side of FIG. 1 exiting from the third stage forming station. Adjacent the exit end of the third stage forming station 14, the metal hose is seen to be supported by a towing cart 38 which in the embodiment shown is the means provided for drawing the metal hose through the three forming stations. The towing cart 38 clampingly holds the metal hose, securing the hose against rotation with respect to the towing cart.

As best seen in FIG. 2, forming discs 22 and 24 are positioned transversely to the direction of movement of the metal hose as indicated by the arrow 41. Forming discs 22 and 24 are seen to be radially offset or loaded in diametrically opposite directions thereby to induce the formation of grooves or corrugations in the metal hose. Forming discs 22 and 24 are freely rotating with their rotating carrier 26.

As is apparent from FIGS. 1 and 2, as the die rings or discs are rotated about the tubing or metal hose 34, the tubing 34 will be fed along in the direction indicated by the arrow 41. Thus as the metal hose passes from the rings, a first groove or corrugation 42 is formed therein. Similarly after the metal hose is passed through the second stage forming discs, a second pass groove or corrugation 44 is formed therein.

First and second stage forming station carriers 26, 26a include an end plate 46 which is affixed to pulley 48 with a spaced apart second end plate 50 spaced apart from end plate 46 by a top plate 52 and a bottom plate 54. In order to properly support the tubing or metal hose which is being corrugated, end plates 46, 50 have affixed thereto guide bushings 56 provided conventionally with a number of radial and thrust bearings adapted to support the tubing 34.

Means are provided for mounting forming discs 22 and 24 to the frame 26 and includes a pivot assembly 60 secured to the top plate 52 to which a conventional bearing unit is secured within which forming discs 22 and 24 are mounted for rotation within the bearing unit. Roller bearings, not shown, are included within the bearing unit appropriately inclined in order to accept both thrust and radial loading and to thus permit free rotation of the forming discs within the bearing unit.

Means are provided to vary the spacing, angulation and loading of forming discs 22 and 24 to adjust position of the bearing unit, such means not being shown since they are well known in the art.

Bearing units carry forming discs 22, 22a and 24, 24a in position at spaced apart intervals, the forming discs of a pair being axially spaced apart along the length of metal hose in multiples of the half-pitch of the corrugations formed in metal hose 34. Advantageously the disc spacing in the second stage is less than that in the first stage and is adjusted to achieve the desired pitch. For example, to achieve a very fine pitch, the annular discs, being radially loaded or offset in diametrically opposite directions, could be spaced apart 360 degrees in the first stage and 180 degrees in the second stage.

The discs of a pair are positioned offset radially and transverse to the longitudinal axis of the metal hose; and are inclined advantageously at an angle between about five to fifteen degrees from a diametral plane of the metal hose and oppositely to each other, thus in rotating combination achieving a smooth and continuous indenting of the hose, producing a corrugation of the configuration and depth desired without danger of cutting the hose.

Guide bushing 56, affixed to the end plates 46 and 50 respectively, is appropriately provided with a number of radial and thrust bearings 62 and 63 respectively adapted to cooperate in supporting the metal hose 34.

The means provided for mounting and adjusting the spacing and angulation of die rings 22 and 24 is shown in FIG. 1 at first stage forming station 10, it being understood that similar mounting means and adjustment means for the forming discs are provided at the second stage forming station 12. The forming discs mounting means includes a pivot assembly 60 mounted on the top plate 52 and carrying a bearing unit bracket 64. Bearing unit bracket 64 supports a bearing unit 66 with forming discs 22 mounted within the inner race of the bearing unit. Radial and thrust roller bearings are appropriately inclined within the bearing unit to permit forming discs 22 to freely rotate within the bearing unit.

A similar pivot assembly 68 is seen mounted on the bottom plate 54 carrying a bearing unit bracket 70 which supports a bearing unit 72. As seen in FIG. 1 at the first stage forming station 10, bearing unit bracket 70 is not directly connected or secured to bottom plate 54, but rather a sliding plate 74 carrying the pivot assembly 68 is secured to the bottom plate between the bottom plate 54 and the bearing unit bracket 70 with appropriate means comprising screw links 76 for slidably moving sliding plate 74, the pivot assembly 68 and the bracket 70 longitudinally in the frame with respect to bottom plate 54.

As is clear, longitudinal sliding movement of sliding plate 74 and the bearing bracket results in a change of position of the bearing unit 72 carried by the bracket 70 with forming discs 24 mounted therein so as to be freely rotatable within the bearing unit. Appropriately inclined roller bearings 80 are mounted within the bearing unit in order to accept both thrust and radial loading and thus permit free rotation of forming discs 24. Longitudinal movement of sliding plate 74 thus results in a change of spacing between forming discs 22 and 24.

Means are provided for varying the angulation and loading of die rings 22 and 24 with respect to each other and include conventional locking screws, screw links and slots in combination with pivot assemblies 60 permitting rotation of bearing unit bracket 64 about pivot assembly 60; and rotation of bearing unit bracket 70 carrying forming discs 24 about the lower pivot assembly 68. Thus, it is seen that means is provided for changing the spacing between the forming discs which results in a change of the pitch of the corrugations produced in the metal hose; and other means are provided to adjust the angulation and loading to further change the pitch of the grooves or corrugations formed in the corrugated metal hose, the particular configuration of the corrugation formed and the depth of the groove produced. As is clear, changes of the radial loading of ring 22 with respect to ring or disc 24 controls to a large extent the depth of the corrugation produced.

Third stage compression forming rollers

Compression forming rollers are provided in a third stage forming station as is seen most clearly in FIG. 1 where the compression rollers are designated generally as 40, said compression rollers rotating in the same direction and at the same speed of rotation as the forming discs in previous stages. The individual rollers are mounted for free rotation about their own axes; and are rotatably mounted in a compression roller assembly 79 for rotation about the longitudinal axis of the hose, the assembly shown in FIGS. 3, 4 secured to plate 82 rotated by conventional drive means. A roller head 80 of the assembly is shown secured threadedly for rotation to plate 82, the roller having on one side thereof three radially extending slots or grooves 84, best seen in FIG. 4, being spaced apart 120 degrees one from the other, the slots slidably receiving three yoke holders 86.

Roller yokes 88 are mounted within openings 90 in the yoke holders, FIG. 3, the yokes having two arms 92 extending inwardly toward a central point which is the longitudinal axis of the metal hose. Each pair of arms carries a compression roller 40 mounted for rotation on an axle secured to the ends of the arms 92.

The compression rollers 40, FIG. 6, are in bearing rolling engagement with the sides of the grooves in the corrugated metal hose with sufficient clearance provided between the outer edges 95 of the two parallel wheels 96 comprising each compression roller and bottom 97 of the corrugated valley to the end that the general configuration of the corrugations of the hose entering the compression roller forming stage is maintained but the width of each corrugation is decreased and the height of each corrugation, and hence the number of corrugations per inch, are markedly increased by the rollers compressing the sides of a corrugation and urging the corrugation upwardly into the space between the roller wheels.

The individual rollers designated compression rollers A, B and C respectively in FIGS. 3 to 5 are seen to be radially spaced apart 120 degrees one from the other resulting in an equalization of compression forces at the metal hose axis. To effect the desired increase in corrugations per inch of metal hose, the distance between the individual wheels or wheel spacing 99 of the rollers 40 in FIG. 6 is decreased successively in the direction of movement of the metal hose with the center line between two wheels of a roller being displaced successively to the right. Thus, the metal hose first encounters roller A which will have a wheel spacing 99 slightly less than the width of the corrugation 101 produced by the prior forming stage.

Roller B, spaced 120 degrees counter clockwise of roller A in FIGS. 3, 4 has its center line between wheels displaced slightly to the right of the roller B center line between wheels, and roller B has a wheel spacing less than that of roller A by approximately one-third the change in corrugation width desired; and roller C similarly has its center line displaced to the right of roller B with a wheel spacing progressively less than that of roller B to complete the change in corrugation width desired, complementing rollers A and B to form a helical corrugation of increased outer diameter and a decreased corrugation width.

Means for adjusting the angulation and radial spacing or distance of the rollers from the longitudinal hose axis are provided and include a threaded stud, nut and washer assembly 98 permitting the relative transverse angulation of the rollers to be readily adjusted by loosening the nut and then tightening again after adjusting the compression roller angulation. A camming assembly 100 is also provided comprising a circular adjusting cam plate 102 having three arcuate slots or tracks 104 therein, FIG. 4, the arcuate center of each individual slot being radially spaced from the longitudinal hose axis for proper camming action to be hereafter described to effect movement inwardly or outwardly from the hose axis.

Cam plate 102 is adjustably secured to yoke holder 86 by a stud fixedly secured to the yoke plate at its one end and having an axle end pivotally received within a roller 106 riding within the arcuate track 104 of the cam plate 102.

The cam plate 102 is locked against rotation relative to the yoke holder and roller head 80 by locking pin 108 bearing against the roller head. Upon loosening locking pin 108, the cam plate may be rotated relative to the roller head, forcing the rollers 106 axially inwardly or outwardly from the center running within their respective arcuate tracks 84 and urging the yoke holder, roller yoke and compression rollers inwardly toward the longitudinal axis of the metal hose.

Thus, the compression rollers are adjustable radially inwardly or outwardly to effect adjustment of the compression force of the rollers as required to achieve a particular configuration.

While separate means for rotating the compression rollers and roller assembly has been shown in FIG. 1, it should be made clear that the roller head may be secured advantageously for rotation conventionally to end plate 50 of the preceding forming stage. Compression roller assembly 79 must be rotated synchronously with the annular forming discs of the preceding stages to achieve a smooth continuous helical corrugation of the hose. Since this is the case, a direct connection between the compression roller assembly and the prior roller assembly stage simplifies the forming operation and assures the desired synchronous rotation.

In another embodiment of the invention, FIG. 1, which has been found advantageous in certain helical corrugating operations, the motors 16, 16a and 28 are disengaged from their respective forming stations and thus the forming discs and rollers are not rotated about the longitudinal hose axis; however, the tubing itself is rotated forwardly through the forming stations as by conventional rotation means. Rotation of the hose effects its movement forwardly through the forming stations the rotation of the hose relative to the freely movable forming discs and compression rollers resulting in helical corrugation of the metal hose.

The operation of the corrugator of the present invention will be apparent from the above description.

The specific embodiments of the invention shown and described above are to be considered illustrative only since various changes in structure are likely to occur to those skilled in the art; and these changes are to be

I claim:

1. A helical corrugator for corrugating a length of metal hose comprising first and second annular forming discs encircling said hose circumferentially and indentably bearing thereon, said forming discs being axially spaced apart and angled transversely to said length of metal hose, said forming discs being radially offset and oppositely angled one to the other, said forming discs being mounted for free rotation about said hose; means for rotating said forming discs synchronously about said hose to form a corrugation in the hose having a relatively large pitch; a plurality of circumferentially spaced apart compression rollers located at a distance axially displaced from said forming discs and rotating synchronously with said forming discs about said hose, said compression rollers indentably compressingly bearing on opposite sides of the corrugation formed in the metal hose by said annular forming discs; and means for rotating said compression rollers synchronously with said forming discs to reduce the pitch of the corrugation.

2. A helical corrugator according to claim 1 and further comprising third and fourth annular forming discs encircling said hose circumferentially and indentably bearing thereon, said third and fourth forming discs being positioned intermediate said compression rollers and said first and second forming discs and adapted to smoothly and continuously form said hose corrugation preparatory to reception by said compression rollers.

3. A helical corrugator for corrugating a length of metal hose comprising first and second annular forming discs encircling said hose circumferentially and indentably bearing thereon, said discs being axially spaced apart and angled transversely to said length of metal hose, said discs being radially offset and oppositely angled one to the other, said discs being mounted for free rotation about said hose; means for rotating said discs synchronously about said hose; a plurality of circumferentially spaced apart compression rollers encircling said hose at a distance axially displaced from said forming discs and rotating synchronously with said forming discs about said hose, said compression rollers indentably compressingly bearing on opposite sides of a corrugation formed in the metal hose by said annular forming discs, each of said compression rollers comprising a pair of fixedly spaced apart first and second rotatable wheels, the first wheels of said compression rollers being spaced progressively closer to the second wheels of said compression rollers whereby a hose corrugation of progressively narrower width is induced in said hose; and means for rotating said rollers synchronously with said discs.

4. A helical corrugator for inducing a greatly increased corrugation height and a greatly decreased corrugation width and pitch in a partially corrugated metal hose comprising a plurality of rotatable compression rollers, said plurality of compression rollers including first, second and third rotatable compression rollers having a pair of fixedly axially spaced apart wheels, said rollers encircling said hose and being equally radially displaced from the hose, the space between said wheels progressively decreasing from said first to second to said third rollers, said pair of wheels of a roller indentably bearing against and compressing opposite sides of a corrugation; and means for rotating said rollers with respect to said metal hose whereby said hose is axially displaced and a corrugation of decreased pitch is formed.

5. Method of helically corrugating metal hose wherein a length of metal hose is drawn forwardly through a first and second axially spaced apart generally synchronously rotating annular forming discs radially offset one from the other transverse to said hose and a plurality of circumferentially spaced apart compression rollers comprising fixedly spaced apart wheels, said method comprising forming corrugations of a particular configuration by indenting said hose by rotating a first disc with respect to said hose; indenting said hose by rotating a second disc with respect to said hose synchronously with said first disc, and then compressing the sides of the corrugation so formed by said discs by rotating a plurality of rollers with respect to said hose synchronously with said discs, said rollers being displaced successively axially forwardly of each other and having a successively narrower wheel spacing than said hose corrugation width.

6. The method of helically corrugating metal hose of claim 5 and including the steps of supporting said discs and rollers for free rotation about their respective axes, maintaining the discs and rollers stationary with respect to rotation about said metal hose, and rotating said hose forwardly successively through said forming discs and said compression rollers.

7. A machine for forming a helical corrugation on a work piece, said machine comprising: a base means; a die assembly supported by said base means for forming a helical corrugation on the work piece, said corrugation including first and second spaced apart generally radially outwardly extending side sections interconnected by an end section; and a plurality of spaced apart work piece forming rollers mounted for rotation about axes located radially outwardly of said end section of the corrugation, each of said work piece forming rollers including a first section for engaging said first side section of the corrugation and a second section for engaging said second side section of the corrugation, said rollers being rotatable to alter the spacing between said first and second side sections of the corrugation to change the pitch and outside diameter of the corrugation.

8. A machine as set forth in claim 7 wherein: a first roller of said plurality of rollers is spaced a first distance from a second roller of said plurality of rollers and said second roller is spaced a second smaller distance from a third roller of said plurality of rollers to reduce the pitch of the corrugation.

9. A machine as set forth in claim 7 wherein: the first section of a first roller of said plurality of rollers is spaced a first distance from the second section of said first roller, and the first section of a second roller of said plurality of rollers is spaced a second distance from the second section of said second roller to alter the spacing between said first and second side sections of the corrugation as the corrugation is engaged by said first and second rollers.

10. A machine for forming a helical corrugation having a predetermined pitch on a work piece, said machine comprising: a base means; a die assembly supported by said base means for forming a helical corrugation on the work piece, said corrugation having a pitch greater than the predetermined pitch and said corrugation including first and second spaced apart generally radially outwardly extending side sections interconnected by a radially outermost arcuate end section; and a roller means rotatably supported by said base means for decreasing the pitch of the corrugation to the predetermined pitch, said roller means including a first work piece forming surface mounted for engagement with said first side section of the corrugation and a second work piece forming surface mounted for engagement with said second side section to decrease the pitch of the corrugation to the predetermined pitch by moving said first side section toward said second side section.

11. A method of forming a corrugation of a predetermined pitch in a work piece comprising the steps of: forming a corrugation in the work piece, said corrugation having a pitch larger than the predetermined pitch; mounting a plurality of rollers with a first roller of said plurality of rollers spaced a first distance from a second roller of said plurality of rollers, and a third roller of said plurality of rollers spaced a second smaller distance from said second roller; interengaging said plurality of rollers with the corrugation; providing relative rotational movement between said plurality of rollers and the corrugation about a central axis of the corrugation; and contemporaneously therewith rotating each roller of said plurality of rollers about an axis associated with the roller and spaced apart from said central axis to reduce the pitch of the corrugation to the predetermined pitch.

References Cited

UNITED STATES PATENTS

| | | | |
|---|---|---|---|
| 390,899 | 8/1888 | Pratt et al. | 72—78 |
| 2,139,714 | 12/1938 | Benson | 72—367 |
| 3,128,821 | 4/1964 | Anderson | 72—77 |

FOREIGN PATENTS

| | | |
|---|---|---|
| 55,042 | 4/1890 | Germany. |
| 134,558 | 9/1919 | Germany. |
| 893,864 | 4/1962 | Great Britain. |

CHARLES W. LANHAM, *Primary Examiner.*

K. C. DECKER, A. L. HAVIS, *Examiners.*